UNITED STATES PATENT OFFICE.

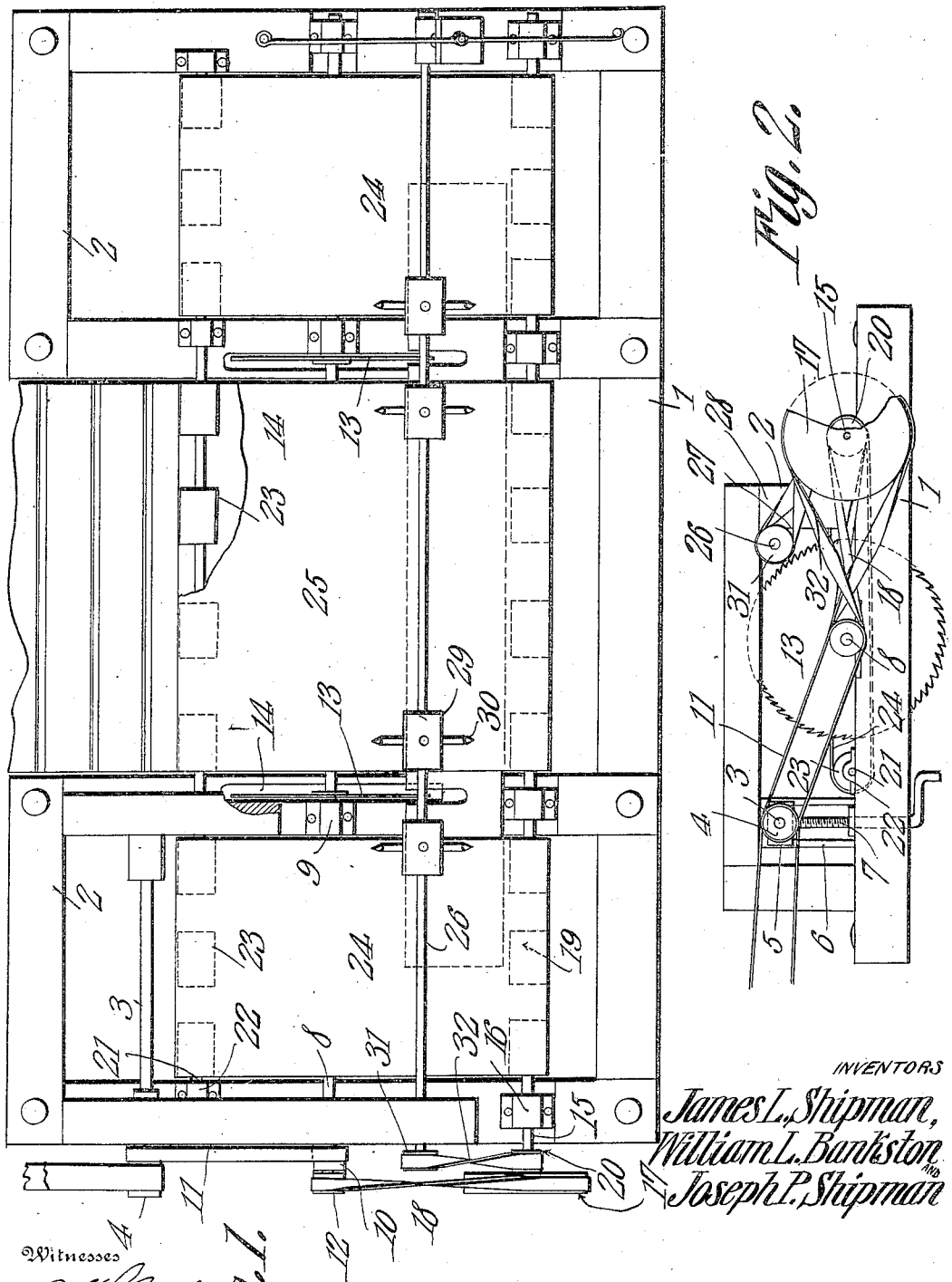

JAMES L. SHIPMAN, WILLIAM L. BANKSTON, AND JOSEPH P. SHIPMAN, OF MOUNDS, OKLAHOMA.

GRAIN-HEADER ATTACHMENT FOR THRESHING-MACHINES.

934,847.  Specification of Letters Patent.  Patented Sept. 21, 1909.

Application filed January 20, 1909. Serial No. 473,292.

*To all whom it may concern:*

Be it known that we, JAMES L. SHIPMAN, WILLIAM L. BANKSTON, and JOSEPH P. SHIPMAN, citizens of the United States, residing at Mounds, in the county of Creek, State of Oklahoma, have invented a new and useful Grain-Header Attachment for Threshing-Machines, of which the following is a specification.

This invention has relation to grain header attachments for threshing machines, and it consists in the novel construction and arrangement of its parts, as hereinafter shown and described.

The attachment is especially adapted to be used on a threshing machine when a grain such as rice is being threshed, and its object is to separate the heads from the stalks or stems and to pass the heads of grain into the thresher and deposit the stems so that they will not be operated upon by the parts of the thresher.

When rice is cut it is usually gathered in shocks, which stand in mud and water, and the stems of the grain accumulate water and mud for at least one foot from their lower ends, as a consequence. Heretofore it has been extremely difficult to thresh rice on account of the wet and muddy condition of the butt ends of the stems, and, in order to avoid this objection, it has been the practice to drag the grain across the field for a considerable distance, in order that the frictional contact between the butts of the stems and the ground would relieve the stems of some of the mud and moisture. During this process however, much of the grain in the heads shakes out and is lost.

It is therefore the object of the present invention to provide an attachment which may be used for severing the butts from the head ends of the stems or stalks, thereby effecting a material saving in the grain and relieving the threshing machine of undue strain incident to handling the wet and muddy butt ends of the stems or stalks.

With the above object in view, the attachment consists of a frame, which may be applied to the receiving end of an automatic threshing feeder, and upon which shafts are journaled for rotation, and which are adapted to receive rotary movement from a rotating part of the thresher to which the attachment is applied. Endless belts are arranged to move in orbits about the said shafts, a middle belt being arranged to receive grain heads, while two side belts are arranged to receive the butts. Means is provided for feeding the grain to the said belts, and saws are mounted for the purpose of severing the grain ends from the butt ends of the stalks or stems.

In the accompanying drawings; Figure 1 is a top plan view of the attachment. Fig. 2 is an end view of the same.

The attachment consists of the frame 1, which is provided at its sides with the spaced wings 2. The space between the said wings is adapted to receive the receiving end portion of an automatic threshing machine feeder. A shaft 3 is journaled for rotation in one of the wings 2, and is provided at its outer end with a pulley 4, around which a belt from a rotating pulley of the thresher (not shown) may pass, whereby rotary movement may be conveyed to shaft 3. The shaft 3 is journaled in the boxes 5, which are movably mounted between the guides 6, said guides being fixed at their ends to portions of the wing 2 of the frame 1. Screws 7 are threaded in fixed portions of the said wing, and bear at their upper ends against the under sides of the said boxes 5 and may be turned for the purpose of moving the said boxes 5 along the guides 6. The object in providing the movable boxes 5 in the guides 6 is that the said shaft may be shifted so as to adjust the tension of belts passing around the pulleys 4.

A shaft 8 is journaled for rotation in the bearings 9, and extends transversely across both of the wings 2 and the space intervening therebetween. The said shaft is provided at one end portion with a pulley 10, and a belt 11 passes around the pulleys 4 and 10. A pulley 12 is also fixed to the end of the shaft 8. Saws 13 are fixed to the shaft 8 and are located in the vicinity of the inner edges of the wings 2 of the frame 1. The inner beams of the said wings are provided with elongated slots 14, which receive the lower portions of the said saws 13. A shaft 15 is journaled for rotation in the bearing 16, and extends transversely across the wings 2 and the space there-between. A relatively large pulley 17 is fixed to the end of the shaft 15, and the cross belt 18 passes around the pulleys 12 and 17. Spaced rolls 19 are located upon the shaft 15, between the opposite sides of the wings 2 and within the space between the said wings. A pulley 20 is also mounted upon the shaft 15 adjacent the pulley 17. A shaft 21 is journaled for rotation in the bearings 22, and extends transversely across the wings 2—2 of the frame 1 and the space intervening there-between. The shaft 21 is parallel with the shaft 15, and is also provided with rolls 23, positioned thereon to correspond with the positions of the rolls 19 upon the shaft 15. Endless belts 24 are arranged to move orbitally along the wings 2 and around the rolls carried between the sides of the said wings and a belt 25 is arranged to move orbitally along the intervening space between the wings 2 and around the rolls carried by the shafts 15 and 21 respectively. The saws 13 are positioned adjacent the edges of the belt 25, as shown in the drawings. A shaft 26 is journaled for rotation in the bearings 27, which are supported upon the standards 28, which, in turn, are mounted upon the outer side portions of the wings 2. The said shaft 26 extends transversely across the wings 2 and the belts 24 and 25. Sleeves 29 are mounted upon the shaft 26 and are located over the inner edges of the belt 24 and the edges of the belt 25. The said sleeves are also located adjacent the opposite sides of the saws 13, and each sleeve 29 is provided with a series of radially disposed arms 30. The shaft 26 is provided at one end with a fixed pulley 31, and a belt 32 passes around the pulleys 20 and 31. Thus it will be seen that inasmuch as rotary movement is transmitted to the shaft 3, the same movement is transmitted through the belts and pulleys above referred to to the shafts 8, 15 and 26, and that rotary movement is transmitted from the shaft 15 to the shaft 21, through the endless belts 24 and 25. The saw shaft 8 rotates in the opposite direction from that in which the shafts 15 and 21 rotate, and the shaft 26 rotates in the same direction as that in which the shaft 8 rotates.

When the attachment is positioned as described and the parts are in motion as set forth, and the butt ends of bundles of grain are placed upon the side belts 24, the heads of the grain will rest upon the intermediate belt 25, and, as the shaft 26 rotates the arms 30 are carried around and the grain is engaged thereby and forced toward the saws 13. The said saws, being in rotation, sever the head portions of the stalks from the butt portions thereof. The head portions are carried along by the belt 25 and delivered to the automatic feeder of the threshing machine, while the butt ends of the stalks are carried by the belts 25 and deposited from the ends thereof upon the ground. Thus, the grain is relieved of the objectionable butt ends of the stalks, while the head ends only are delivered to the threshing machine.

Having thus described our invention, what we claim as new, and desire to secure, by Letters Patent, is:—

A thresher attachment comprising a frame having spaced side wings, side belts mounted for orbital movement along the wings, an intermediate belt mounted for orbital movement along the intervening space between the wings, saws mounted for rotation between the side belts and the intermediate belt, a shaft journaled for rotation above the belts and in advance of the saws, and radially disposed feeding arms carried by the said shaft and located above the said belts, and at opposite sides of the saws.

In testimony that we claim the foregoing as our own, we have hereto affixed our signatures in the presence of two witnesses.

JAMES L. SHIPMAN.
WILLIAM L. BANKSTON.
JOSEPH P. SHIPMAN.

Witnesses:
W. E. WHITE,
W. C. ADAIR.